United States Patent
Sugimura et al.

(10) Patent No.: US 8,433,561 B2
(45) Date of Patent: Apr. 30, 2013

(54) PRINTER

(75) Inventors: Yoshihiko Sugimura, Aichi (JP); Naoki Tanjima, Aichi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 612 days.

(21) Appl. No.: 12/724,948

(22) Filed: Mar. 16, 2010

(65) Prior Publication Data
US 2010/0247204 A1 Sep. 30, 2010

(30) Foreign Application Priority Data
Mar. 30, 2009 (JP) ................ 2009-082939

(51) Int. Cl.
| G06F 17/21 | (2006.01) |
| G06F 11/00 | (2006.01) |
| B41J 5/30 | (2006.01) |
| B41J 5/40 | (2006.01) |
| G06K 3/00 | (2006.01) |
| G06K 7/00 | (2006.01) |

(52) U.S. Cl.
USPC ............... 704/10; 400/62; 347/14; 358/1.16

(58) Field of Classification Search .................. 704/10; 400/62; 347/14; 358/1.16
See application file for complete search history.

(56) References Cited

U.S. PATENT DOCUMENTS

| 3,929,216 | A | * | 12/1975 | Einbinder | 400/484 |
| 4,783,645 | A | * | 11/1988 | Goldwasser et al. | 341/22 |
| 4,893,238 | A | * | 1/1990 | Venema | 715/236 |
| 5,475,767 | A | * | 12/1995 | Du | 382/185 |
| 5,495,413 | A | * | 2/1996 | Kutsumi et al. | 704/4 |
| 5,606,538 | A | * | 2/1997 | Maruno et al. | 369/47.23 |
| 5,649,223 | A | * | 7/1997 | Freeman | 715/257 |
| 5,687,383 | A | * | 11/1997 | Nakayama et al. | 704/2 |
| 5,826,220 | A | * | 10/1998 | Takeda et al. | 704/7 |
| 6,041,292 | A | * | 3/2000 | Jochim | 704/3 |
| 6,424,935 | B1 | * | 7/2002 | Taylor | 704/10 |
| 6,718,367 | B1 | * | 4/2004 | Ayyadurai | 709/206 |
| 7,016,829 | B2 | * | 3/2006 | Brill et al. | 704/9 |
| 7,181,391 | B1 | * | 2/2007 | Jia et al. | 704/231 |
| 7,383,182 | B2 | * | 6/2008 | Taylor | 704/235 |
| 7,409,336 | B2 | * | 8/2008 | Pak et al. | 704/9 |
| 2004/0139404 | A1 | | 7/2004 | Kawashima | |
| 2008/0162118 | A1 | | 7/2008 | Itoh | |
| 2009/0106283 | A1 | | 4/2009 | Tanjima et al. | |

FOREIGN PATENT DOCUMENTS

| EP | 2 015 195 | 1/2009 |
| JP | 09282314 | 10/1997 |
| JP | 2000-259617 | 3/1999 |
| JP | 2009-015756 | 7/2007 |

\* cited by examiner

*Primary Examiner* — Eric Yen

(74) *Attorney, Agent, or Firm* — McCarter & English, LLP

(57) ABSTRACT

A tape printing apparatus registers a word string constituting document data to be printed by depression of a print key in a learnt-contents storing region under subscribed conditions. A CPU divides the document data to be printed into letter strings based on information about constituent letters of the to-be-printed word string and a learning condition determination table. Thereafter, the CPU determines whether or not the to-be-printed word string should be registered based on registered letter string data stored in the learnt-contents storing region and the contents of the divided letter string.

9 Claims, 12 Drawing Sheets

| KINDS OF LETTERS (SAMPLE) | LEARNING SETTING | ATTRIBUTION TYPE OF CONSTITUENT LETTERS |
|---|---|---|
| ALPHABETS (A,B⋯Z a,b⋯z) | ○ | MAIN ATTRIBUTION |
| ARABIC NUMERALS (0, 1, 2⋯9) | × | SUBORDINATE ATTRIBUTION |
| ROMAN NUMERALS ( I , II ⋯ i , ii ⋯) | × | SUBORDINATE ATTRIBUTION |
| ARITHMETIC SYMBOLS (+,−,×,÷,=⋯) | × | SUBORDINATE ATTRIBUTION |
| GREEK ALPHABETS (α β γ ⋯) | ○ | MAIN ATTRIBUTION |
| □ (SPACE) | × | − |

| TIMES OF WORD LEARNING PROCESS | DETERMINATION-TARGET SET OF WORDS | STORED CONTENTS IN LEARNT-CONTENTS STORING REGION | |
|---|---|---|---|
| | | BEFORE PROCESSED | AFTER PROCESSED |
| 1ST ROUND | BOOK01 | | BOOK |
| 2ND ROUND | BOOK02 i ii iii | BOOK | BOOK |
| 3RD ROUND | BOOK03 α β γ | BOOK | BOOK α β γ |

| TIMES OF WORD LEARNING PROCESS | DETERMINATION-TARGET SET OF WORDS | STORED CONTENTS IN LEARNT-CONTENTS STORING REGION | | | |
|---|---|---|---|---|---|
| | | BEFORE PROCESSED | | AFTER PROCESSED | |
| | | MAIN | SUB | MAIN | SUB |
| 1ST ROUND | BOOK01 | | | BOOK | 01 |
| 2ND ROUND | BOOK02 | BOOK | 01 | BOOK | 01 |
| | | | | | 02 |
| 3RD ROUND | BOOK03 | BOOK | 01 | BOOK | 01 |
| | | | 02 | | 02 |
| | | | | | 03 |

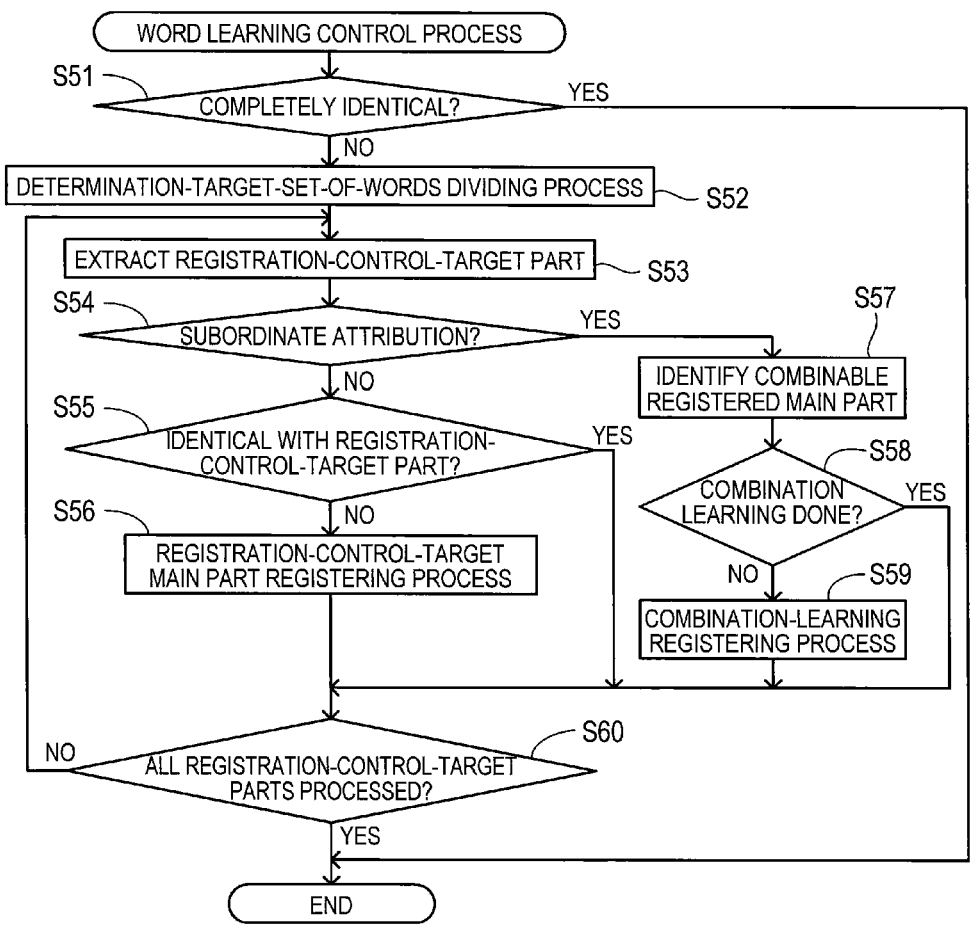

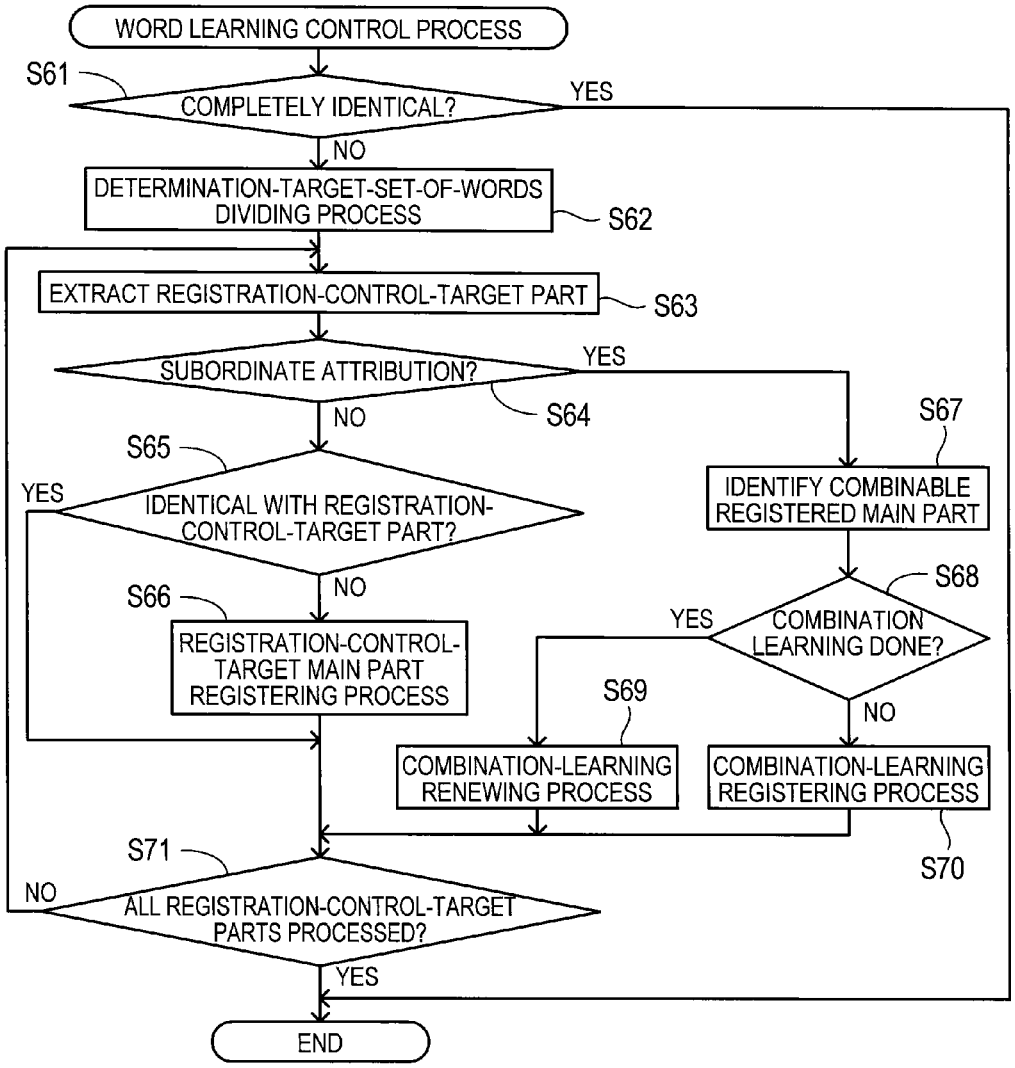

| TIMES OF WORD LEARNING PROCESS | DETERMINATION-TARGET SET OF WORDS | STORED CONTENTS IN LEARNT-CONTENTS STORING REGION | |
|---|---|---|---|
| | | BEFORE PROCESSED | AFTER PROCESSED |
| 1ST ROUND | BOOK01 | | BOOK01 |
| 2ND ROUND | BOOK02 | BOOK01 | BOOK01 |

| TIMES OF WORD LEARNING PROCESS | DETERMINATION-TARGET SET OF WORDS | STORED CONTENTS IN LEARNT-CONTENTS STORING REGION | |
|---|---|---|---|
| | | BEFORE PROCESSED | AFTER PROCESSED |
| 1ST ROUND | BOOK01 | | BOOK01 |
| 2ND ROUND | BOOK02 | BOOK01 | BOOK02 |

| DETERMINATION-TARGET SET OF WORDS | STORED CONTENTS IN LEARNT-CONTENTS STORING REGION | |
|---|---|---|
| | BEFORE PROCESSED | AFTER PROCESSED |
| BOOK | | BOOK |
| BOOK02 | | NO REGISTRATION |

PRINTER

CROSS REFERENCE TO RELATED APPLICATIONS

The present application claims priority from Japanese Patent Application No. JP 2009-082939, which was filed on Mar. 30, 2009, the disclosure of which is incorporated herein by reference in its entirety.

TECHNICAL FIELD

The disclosure relates to a printer that has word learning functions to learn words inputted thereto under predetermined conditions and make use of accumulative learning results.

BACKGROUND

There has been devised a conventional tape printing apparatus learning words that has been inputted and subsequently printed. The structure of a letter string ready for print operation reflects user's intention more definitely in comparison with a point of time where the user simply decides a letter string that constitutes a word. Accordingly, the conventional tape printing apparatus learns significant number of letter strings that reflect user's intentions so that learnt-and-stored contents can be made use for future chances.

The conventional tape printing apparatus is likely to cause a situation that the learning-purpose memory device stores not-efficiently-used learnt-and-stored contents without storing efficiently-used ones.

SUMMARY

The disclosure has been made to solve the above-described problem and has an object to provide a printer with word learning functions capable of storing learning results properly.

To achieve the purpose of the disclosure, there is provided a printer comprising: a letter string input unit that inputs letter string data consisting of plural letters as to-be-printed target; a print operation unit that is operated when inputted letter string data that has been inputted by the letter string input unit as to-be-printed target; a print unit that prints the inputted letter string on a printing medium in accordance with an operation of the print operation unit; a storage unit that stores registered letter string data including a specific letter string; a detector unit that detects registration-target letter string data to be stored in the storage unit from the inputted letter string data when an operation of the print operation unit is carried out; and a registration unit that registers the registration-target letter string data detected by the detector unit in the storage unit as the registered letter string data in accordance with a predetermined condition, wherein the printer further comprises: a divider unit that divides the registration-target letter string data into specific letter string data corresponding to the specific letter string and additional letter string data that is added to the specific letter string data; a judgment unit that judges accord and discord between the registration-target letter string data and a combination of the specific letter string data and the additional letter string data, based on registered letter string stored in the storage unit; and a registration control unit that controls the registration unit so as to change registration rules for storing registration-target letter string data in the storage unit in accordance with a judgment result obtained by the judgment unit.

BRIEF DESCRIPTION OF THE DRAWINGS

FIG. 14 is a flowchart of a word learning control process program directed to a third embodiment;

FIG. 15 is a diagram for explaining stored contents of a learnt-contents storing region directed to the third embodiment;

FIG. 16 is a flowchart of a word learning control process program directed to a fourth embodiment;

FIG. 17 is a diagram for explaining stored contents of a learnt-contents storing region directed to the fourth embodiment;

DETAILED DESCRIPTION

A detailed description of an exemplary embodiment of a tape printing apparatus 1 embodying a printer directed to the disclosure will now be given referring to the accompanying drawings.

(First Embodiment)

Figure 1:
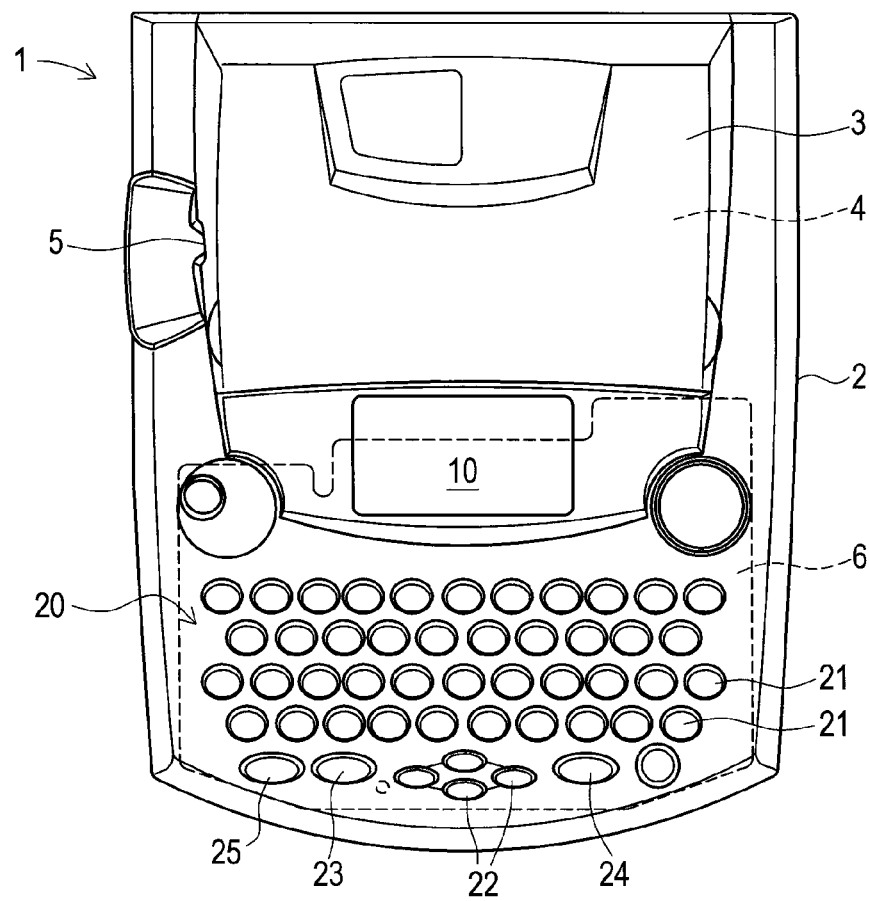
FIG. 1 is a top plan view of a tape printing apparatus directed to a first embodiment.
Figure 2:
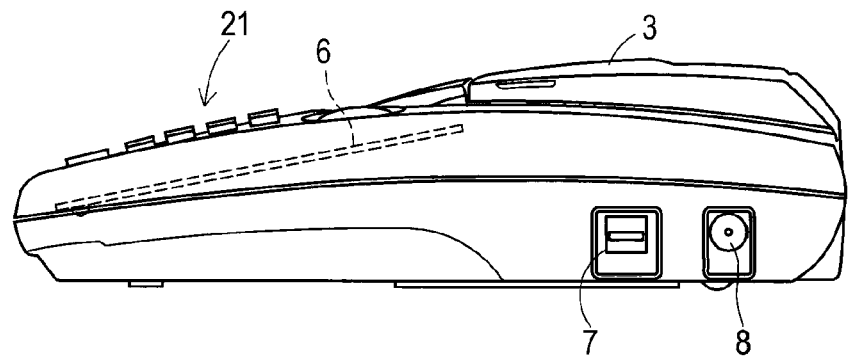
FIG. 2 is a side view of the tape printing apparatus directed to the first embodiment.

First, the schematic structure of the tape printing apparatus 1 directed to a first embodiment will be described by referring to drawings. As shown in FIG. 1 and FIG. 2, the tape printing apparatus 1 directed to the first embodiment includes a liquid crystal display 10 and a keyboard 20 on the top of a housing 2. Further, a cassette holding portion 4 is formed at the housing 2. The cassette holding portion 4 is where a tape cassette is loaded. The tape cassette houses a tape in a spooled state therein, the tape being made of heat-sensitive paper or the like. The cassette holding portion 4 is covered by a housing cover 3 mounted above in an openable-and-closable manner. A tape ejecting portion 5 is formed at the left side of the cassette holding portion 4. The tape ejecting portion 5 ejects a tape pulled out from the cassette tape. On the pulled-out tape, print is applied by a thermal head 40 to be described later.

The liquid crystal display 10 is a display device to display various stuff in accordance with operation with the keyboard 20. For instance, when basic letter input keys 21, cursor keys 22, a conversion key 23 and the like are operated, the liquid crystal display 10 serves to display letters such as alphabets, Japanese kana letters and the like in accordance with the input operation (refer to FIG. 5).

The keyboard 20 includes plural operation keys. More specifically, the keyboard 20 includes letter input keys 21, cursor keys 22, a conversion key 23, a return key 24 and a print key 25.

The letter input keys 21 are operated for inputting Japanese kana letters, numbers, alphabets, and the like. The cursor keys 22 are operated for moving a cursor being indicated in the liquid crystal display 10 up, down, left or right. The conversion key 23 is operated for converting a letter string inputted by operation of letter input keys 21. The conversion of a letter string refers to various conversions between kanji characters and hiragana/katakana letters (Japanese phonograms), between kana characters and alphabets, and the like. The return key 24 is operated for selecting set contents for use or determining a proper conversion from among conversion candidates of an inputted letter string. Further, the print key 25 is operated for executing print based on a letter string inputted by a user.

Beneath the keyboard 20, a control board 6 is arranged. The control board 6 constitutes a control circuit unit for controlling the entirety of the tape printing apparatus 1. At the right side of the cassette housing portion 4, a connector 7 and an adapter inlet 8 are arranged. A USB cable is connected to the connector 7 for connecting to an external appliance (e.g., a personal computer). A power supply adapter is connected to the adapter inlet 8.

Figure 3:
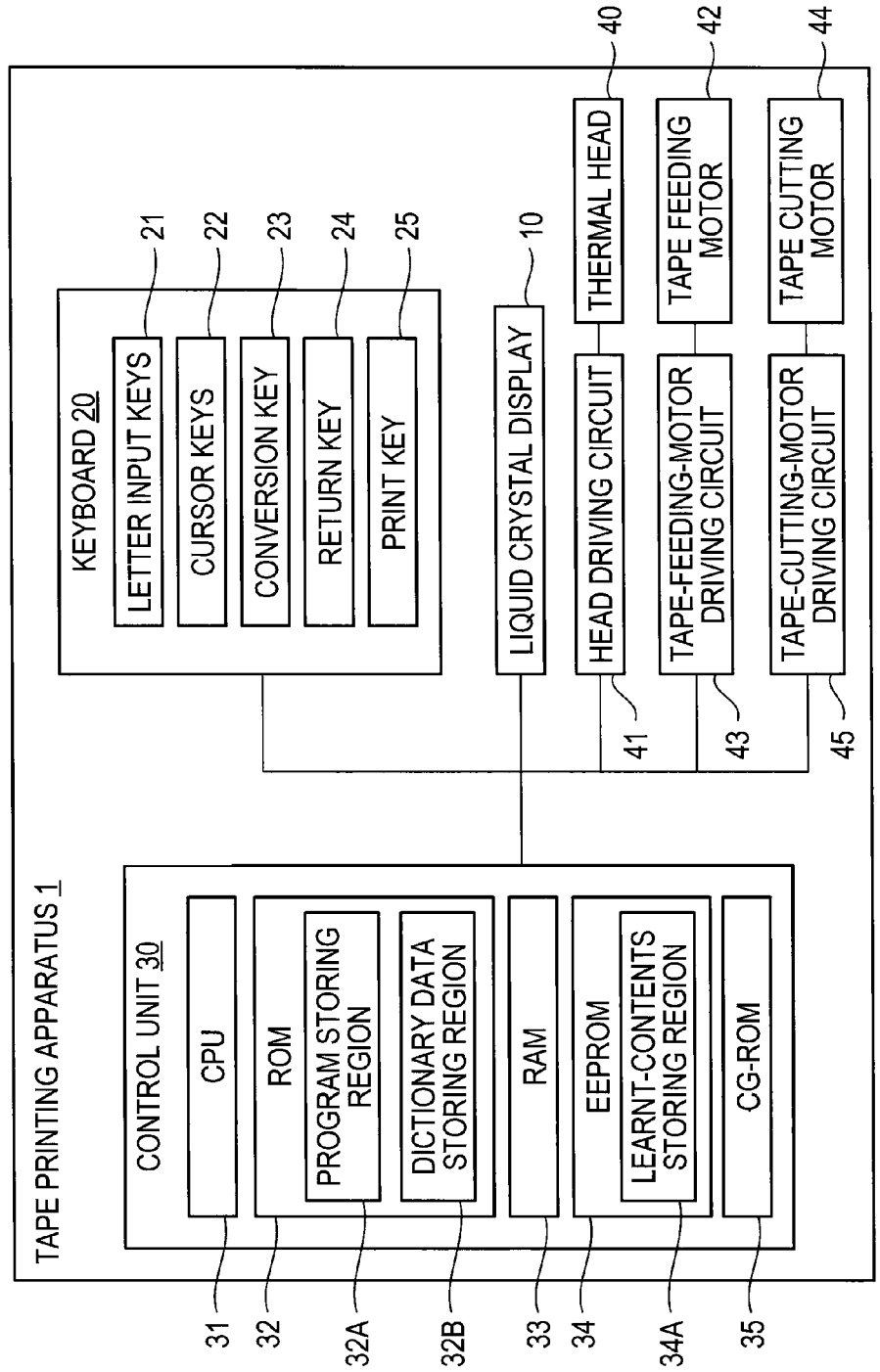
FIG. 3 is a block diagram indicating a control system of the tape printing apparatus.

Next, there will be described on a control configuration of the tape printing apparatus 1 by referring to FIG. 3.

As shown in FIG. 1 and FIG. 2, the control board 6 is installed inside the tape printing apparatus 1. The control board 6 includes a control unit 30, a head driving circuit 41, a tape-feeding-motor driving circuit 43 and a tape-cutting-motor driving circuit 45.

The control unit 30 consists of a CPU 31, a ROM 32, a RAM 33, an EEPROM 34 and a CG-ROM 35. The control unit 30 is connected to the head driving circuit 41, the tape-feeding-motor driving circuit 43 and the tape-cutting-motor driving circuit 45. The control unit 30 is also connected to the liquid crystal display 10 and the keyboard 20.

The CPU 31 is a central processing unit that plays a primary role for various system control of the tape printing apparatus 1. Accordingly, the CPU 31 controls various peripheral devices in accordance with input signals by means of the keyboard 20 or the like as well as a main control program (refer to FIGS. 6 through 8 and FIG. 10) to be described later or the like.

The ROM 32 stores various control programs and various data for the tape printing apparatus 1. The ROM 32 includes a program storing region 32A and a dictionary-data storing region 32B.

The program storing region 32A stores a main control program (refer to FIG. 6), a document editing process program (refer to FIG. 7), a word learning process program (refer to FIG. 8) and a word learning control process program (FIG. 10 etc.) all of which will be described later. The program storing region 32A stores a document creation program 50. The dictionary-data storing region 32B stores dictionary data to be used when a letter string is converted in accordance with operation of the conversion key 23. The ROM 32 stores a learning condition determination table (refer to FIG. 9).

The RAM 33 is a storing device for temporarily storing a processing result of the CPU 31 etc,. The RAM 33 also stores print data created with inputs by means of the keyboard 20.

The EEPROM 34 is a non-volatile memory that allows data write for storing therein and deletion of stored data therefrom. The EEPROM 34 stores data that indicates user setting etc. of the tape printing apparatus 1. The EEPROM 34 includes a learnt-contents storing region 34A. The learnt-contents storing region 34A stores letter string data wherein each item of stored letter string data constitutes a word through a word learning process (S5) to be described later. The CG-ROM 35 is a memory for a character generator wherein image data of to-be-printed letters and signs are associated with code data and stored in dot patterns.

The head driving circuit 41 is a circuit that serves to supply a driving signal to the thermal head 40 in response to a control signal from the CPU 31 for controlling operation manners of the thermal head 40. At the time of controlling operation for the thermal head 40, the head driving circuit 41 controls heating of the thermal head 40 as a whole by regulating electric conduction conditions of all the heating elements arranged at the thermal head 40.

The tape-feeding-motor driving circuit 43 is a control circuit that serves to supply a driving signal to the tape feeding motor 42 in response to a control signal from the CPU 31 for controlling operation of the tape feeding motor 42. The tape-cutting-motor driving circuit 45 is a circuit that serves to supply a driving signal to the tape cutting motor 44 in response to a control signal from the CPU 31 for controlling operation of the tape cutting motor 44.

Next, there will be described on functions of the document creation program 50 in detail by referring to FIG. 4.

Figure 4:
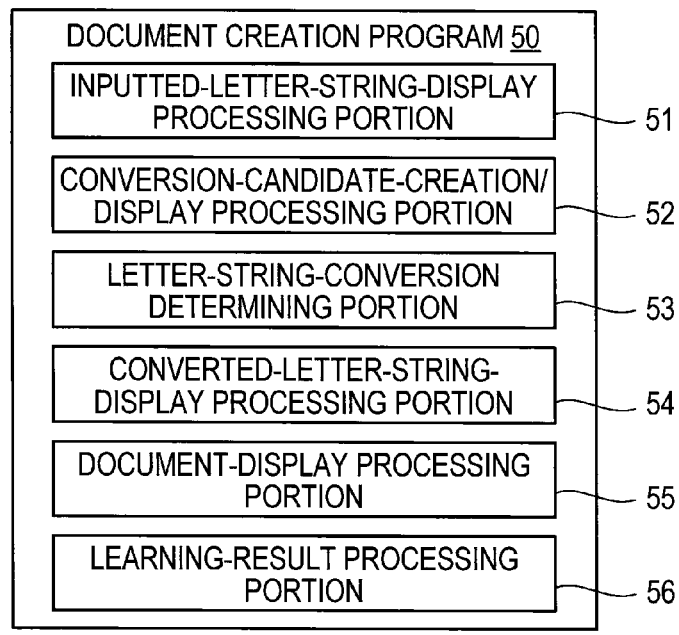
FIG. 4 is a diagram for indicating a functional structure of a document creation program.

As shown in FIG. 4, the document creation program 50 includes an inputted-letter-string-display processing portion 51, a conversion-candidate-creation/display processing portion 52, a letter-string-conversion determining portion 53, a converted-letter-string-display processing portion 54, a document display processing portion 55 and a learning processing portion 56.

The inputted-letter-string-display processing portion 51 carries out a process for displaying in the liquid crystal display 10 a letter string a user has inputted with the keyboard 20. The conversion-candidate-creation/display processing portion 52 carries out a process for creating conversion candidates with respect to inputted letter string displayed in the liquid crystal display 10 by searching and retrieving from among stored contents in the dictionary-data storing region 32B. The conversion-candidate-creation/display processing portion 52 further carries out a process for displaying the thus created conversion candidates in the liquid crystal display 10. The letter-string-conversion determining portion 53 carries out a process for determining a finally-converted letter string the user has chosen from among the plural conversion candidates displayed in the liquid crystal display 10. The converted-letter-string-display processing portion 54 carries out a process for displaying in the liquid crystal display 10 the converted letter string thus determined by the user. The document-display processing portion 55 carries out a process for displaying in the liquid crystal display 10 the letter string the user has determined by operating the keyboard 20. The learning processing portion 56 carries out a process for learning for future chances to create documents.

Next, there will be described on the structure of the liquid crystal display 10 that displays document contents and the like for creating documents etc. by referring to FIG. 5.

Figure 5:
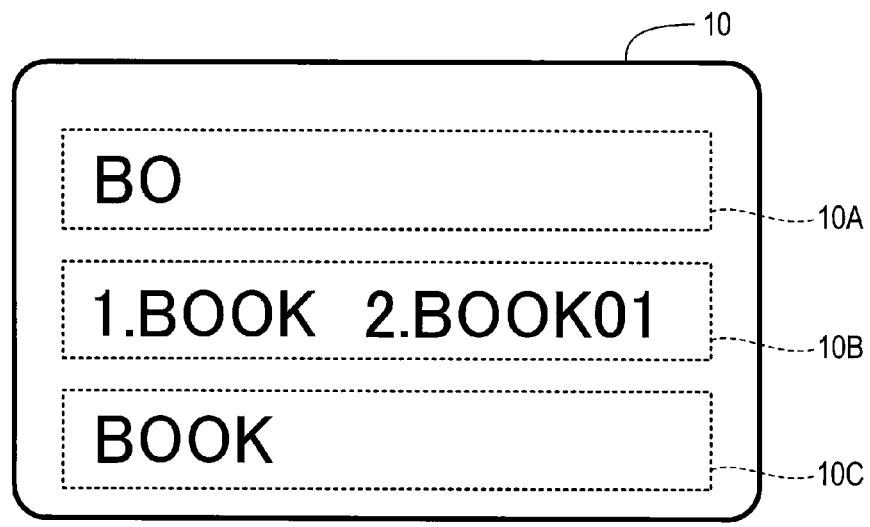
FIG. 5 is a diagram showing a display example of a liquid crystal display at the time of document creation.

As shown in FIG. 5, the liquid crystal display 10 includes an inputted-contents displaying section 10A, a conversion-candidates displaying section 10B and a document-contents displaying section 10C. The inputted-contents displaying section 10A displays letters of a letter string a user has inputted in accordance with operation of the keyboard 20. The conversion-candidates displaying section 10B displays conversion candidates that can possibly correspond to the letter string that has been inputted and displayed in the inputted-contents displaying section 10A. Conversion candidates are created by the conversion-candidate-creation/display processing portion 52 based on the inputted letter string and stored contents in the dictionary-data storing region 32B. The document-contents displaying section 10C displays contents of the settled letter string settled in accordance with the operation with the keyboard 20.

Figure 6:
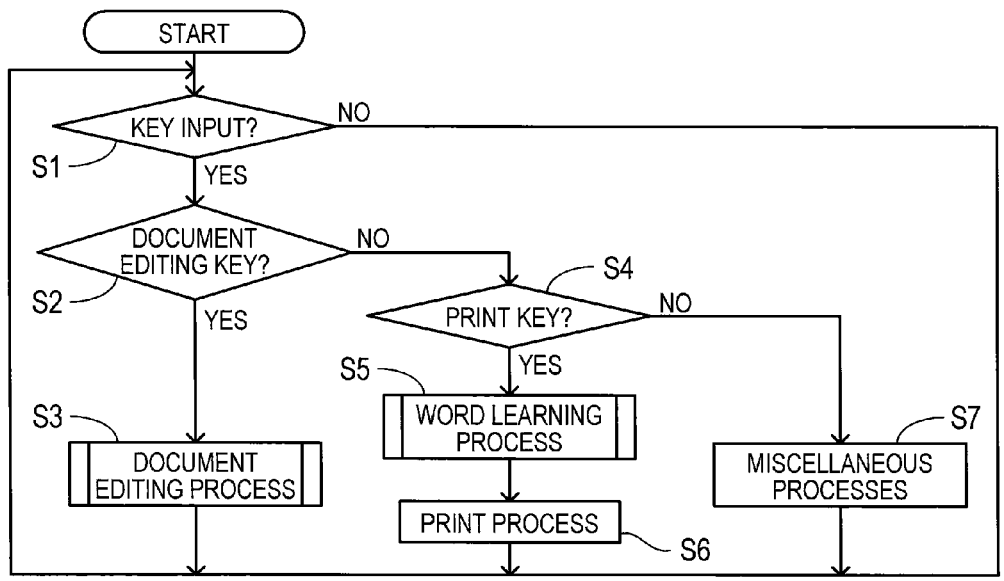
FIG. 6 is a flowchart of a main control program.

There will be described on a main control program for the tape printing apparatus 1 by referring to FIG. 6.

At S1, the CPU 31 determines whether or not a key input has been made by the user by means of the keyboard 20. In case a key input has been made (S1: YES), the CPU 31 shifts the process to S2. On the other hand, in case no key input has been made (S1: NO), the CPU 31 puts the process in a stand-by state until a key input is made.

At S2, the CPU 31 determines whether or not the key input made at 51 is an input of a document editing key. The document editing key refers to the letter input keys 21, the cursor keys 22, the conversion key 23 and the return key 24. In case the key input is from a document editing key (S2: YES), the CPU 31 shifts the process to S3. On the other hand, the key input is not from a document-editing key (S2: NO), the CPU 31 shifts the process to S4.

Shifting to S3, the CPU 31 carries out a document editing process. Specifically, in the document editing process (S3), the CPU 31 carries out a document editing process program so as to edit an inputted letter string. More specifically, the CPU 31 carries out an input of a letter or a character, a deletion of a letter or a character, a conversion of a letter string, etc. in accordance with a key input by the user. The details of the document editing process will be described later by referring to drawings. Upon completion of the document editing process, the CPU 31 returns the process to S1.

At S4, the CPU 31 determines whether or not the key input made at S1 is an input of the print key 25. In case the key input is from the print key 25 (S4: YES), the CPU 31 shifts the process to S5. On the other hand, in case the key input is not from the print key 25 (S4: NO), the CPU 31 shifts the process to S7.

At S5, the CPU 31 carries out a word learning process. At the word learning process (S5), the CPU 31 carries out a word learning process program so as to register in the learnt-contents storing region 34A word data that constitutes document data set as being subject to print under subscribed conditions. The details of the word learning process program will be described later by referring to drawings. Upon completion of the word learning process (S5), the CPU 31 shifts the process to S6.

Shifting to S6, the CPU 31 carries out a print process. At the print process, the CPU 31 sets as print subject the document data already inputted when the input from the print key 25 is made and has the document data printed on a tape by means of the thermal head 40 or the like. Upon completion of the print process, the CPU 31 returns the process to S1.

At S7, the CPU 31 carries out miscellaneous processes. The miscellaneous processes include processes for setting various conditions including setting of print conditions. Upon completion of the miscellaneous processes, the CPU 31 returns the process to S1.

Figure 7:
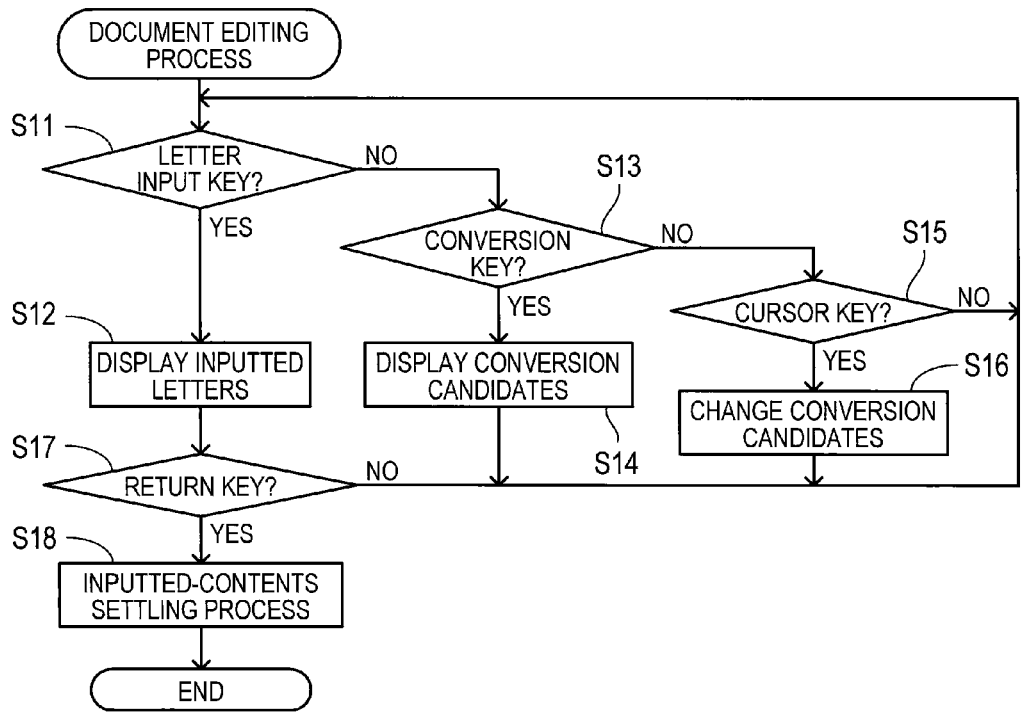
FIG. 7 is a flowchart of a document editing process program.

Next, there will be described on the document editing process program carried out at S3 in detail, by referring to FIG. 7.

At S11, the CPU 31 determines whether or not the key input at S3 is an input of a letter input key 21. In case the key input is from a letter input key 21 (S11: YES), the CPU 31 shifts the process to S12. On the other hand, in case the key input is not from a letter input key 21 (S11: NO), the CPU 31 shifts the process to S13.

At S12, the CPU 31 displays in the inputted-contents displaying section 10A a letter inputted with the input key 21. After displaying the inputted letter in the inputted-contents displaying section 10A, the CPU 31 shifts the process to S17.

Shifting to S13, the CPU 13 determines whether or not the key input at S3 is an input of the conversion key 23. In case the key input is from the conversion key 23 (S13: YES), the CPU 31 shifts the process to S14. On the other hand, in case the key input is not from the conversion key 23 (S13: NO), the CPU 31 shifts the process to S15.

At S14, based on data directed to a letter string subject to conversion (e.g., a letter string displayed in the inputted-contents display section 10A), the stored contents in the dictionary-data storing region 32B and the stored contents in the learnt-contents storing region 34A, the CPU 31 has the conversion-candidate-creation/display processing portion 52 display conversion candidates in the conversion-candidates displaying section 10B. After displaying the conversion candidates in the conversion-candidates displaying section 10B, the CPU 31 shifts the process to S17.

At S15, the CPU 31 determines whether or not the key input at S3 is an input of a cursor key 22. In case the key input is from the cursor key 22 (S15: YES), the CPU 31 shifts the process to S16. On the other hand, in case the key input is not from the cursor key 22 (S15: NO), the CPU 31 returns the process to S11.

Shifting to S16, the CPU 31 changes a conversion candidate currently chosen to another conversion candidate from among the conversion candidates displayed in the conversion-candidates displaying section 10B. After changing choices of conversion candidates, the CPU 31 shifts the process to S17.

At S17, the CPU 31 determines whether or not a key input has of the return key 24 has been made. In case an input of the return key 24 has been made (S17: YES), the CPU 31 shifts the process to S18. On the other hand, in case an input of the return key 24 has not been made (S17: NO), the CPU 31 shifts the process to S11.

At S18, the CPU 31 carries out an inputted-contents settling process. At the inputted-contents settling process (S18), the CPU 31 settles a final state of the inputted letter string as it is currently displayed in the inputted-contents displaying section 10A. Upon completion of the inputted-contents settling process, the CPU 31 finalizes the document editing process program and returns the process to S1.

Next, there will be described on a word learning process program to be carried out at S5 in detail, by referring to FIG. 8.

At S21, the CPU 31 obtains information about constituent letters with respect to to-be-printed letter string data. The information about constituent letters refers to information about various attributes such as a font and the like of each letter constituting the to-be-printed letter string data (document data). Obtaining the information about the constituent letters, the CPU 31 shifts the process to S22.

At S22, the CPU 31 carries out a set-of-words extracting process. At the set-of-words extracting process (S22), the CPU 31 extracts sets of words, each set including at least one word, from the to-be-printed letter string data based on the stored contents in the dictionary-data storing region 32B and divides the to-be-printed letter string data into sets of words. Upon completion of the set-of-words extracting process, the CPU 31 shifts the process to S23.

Shifting to S23, the CPU 31 picks up one set of words from the sets of words extracted at the set-of-words extracting process and sets the thus picked-up set of words as determination-target set of words. A determination-target set of words is referred to as single set of words extracted from to-be-printed letter string data and set as word-learning-determination target. After picking up the determination-target set of words, the CPU 31 shifts the process to S24.

At S24, the CPU 31 carries out a word learning control process. At the word learning control process (S24), the CPU 31 carries out a word learning control process program. Specifically, the CPU 31 carries out registration control with respect to a letter string constituting a determination-target set of words based on the current stored contents in the learnt-contents storing region 34A and a learning condition determination table (refer to FIG. 9). The details of the word learning control process program will be described later by referring to drawings. Upon completion of the word learning control process, the CPU 31 shifts the process to S25.

There will be described on the learning condition determination table in detail, by referring to FIG. 9. As shown in FIG. 9, the learning condition determination table defines learning setting and attribution type of constituent letters for each kind of letters. Kinds of letters refer to alphabets, Arabic numerals, Roman numerals, arithmetic symbols, Greek alphabets and a space.

The learning setting indicates whether word learning is necessary or unnecessary with respect to a word depending on kinds of letters constituting a word. Attribution type of constituent letters indicates whether a homogeneous-kind letter string is main attribution or subordinate attribution depending on the kind of letters constituting the homogeneous-kind letter string. Here, main attribution means that the homogeneous-kind letter string in question shall be registered solely without being associated with another homogeneous-kind letter string. Subordinate attribution means that the homogeneous-kind letter string in question shall be learned with being associated with another homogeneous-kind letter string that is defined as main attribution.

At S25, the CPU 31 determines whether or not the word learning process has been carried out for all sets of words constituting the to-be-printed letter string data. In case the process has been carried out for all the sets of word (S25: YES), the CPU 31 finalizes the word learning process program and shifts the process to S6. On the other hand, in case the process has not been carried out for all the sets of words (S25: NO), the CPU 31 shifts the process to S23. Then, the CPU 31 picks up a new set of words as determination-target set of words and carries out the word learning control process for the new determination-target set of words (S24).

Figures 10, 11:
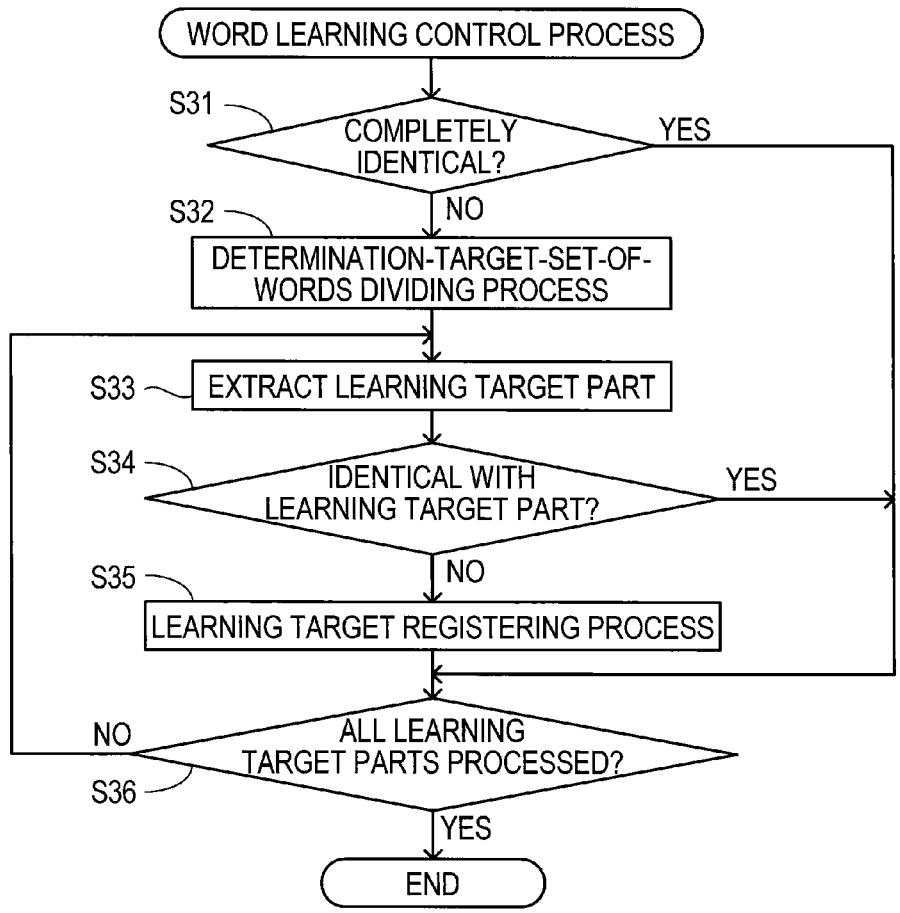
FIG. 10 is a flowchart of a word learning control process program directed to the first embodiment.
FIG. 11 is a diagram for explaining stored contents of a learnt-contents storing region directed to the first embodiment.

Next, there will be described on the word learning control process program directed to the first embodiment in detail, by referring to FIG. 10. The word learning control process program is carried out at S24 by the CPU 31.

At S31, the CPU 31 determines whether or not the determination-target sets of words is completely identical with one item of registered letter string data that have been registered in the learnt-contents storing region 34A. Specifically, the CPU 31 carries out the determination process of S31 based on stored contents in the learnt-contents storing region 34A and information about constituent letters of the determination-target set of words. In case the determination-target set of words and one item of the registered letter string data are completely identical with each other (S31: YES), the CPU 31 shifts the process to S36. On the other hand, in case the determination-target set of words and any one item of the registered letter string data are not completely identical with each other (S31: NO), the CPU 31 shifts the process to S32.

At S32, the CPU 31 carries out a determination-target set of words dividing process. At the determination-target set of words dividing process (S32), the CPU 31 divides the determination-target set of words by kinds of letters based on the information about constituent letters directed to the determination-target set of words. Upon completion of the determination-target set of word dividing process, the CPU 31 shifts the process to S33.

Shifting to S33, the CPU 31 extracts a learning target part from the determination-target set of words based on the learning condition determination table and the information about constituent letters. A learning target part refers to a homogeneous-kind letter string that is made up with a single kind of letters and defined as "learning setting: valid", from among homogeneous-kind letter strings divided at the determination-target set of words dividing process. More particularly, a learning target part means a determination target part that is to be or not to be registered in the learnt-contents storing region 34A. After extracting the learning target part, the CPU 31 shifts the process to S34.

At S34, the CPU 31 determines whether or not the learning target part is completely identical with one item of the registered letter string data. In case the learning target part is completely identical with one item of the registered letter string data (S34: YES), the CPU 31 shifts the process to S36. On the other hand, in case the learning target part is not completely identical with any one item of the registered letter string data (S34: NO), the CPU 31 shifts the process to S35.

At S35, the CPU 31 carries out a learning target registering process. At the learning target registering process (S35), the CPU 31 registers a homogeneous-kind letter string (i.e., a word) constituting the learning target part in the learnt-contents storing region 34A. That is, in case the homogeneous-kind letter string constituting the learning target part has not been registered in the learnt-contents storing region 34A, the CPU 31 learns the homogeneous-kind letter string corresponding to the learning target part. Upon completion of the learning target registering process, the CPU 31 shifts the process to S36.

Shifting to S36, the CPU 31 determines whether or not a series of processes of S33 through S35 has been carried out for all the learning target parts constituting to-be-printed letter string data. In case the series of the processes has been done for all the learning target parts (S36: YES), the CPU 31 finalizes the word learning control process program and shifts the process to S25. On the other hand, in case the series of the processes has not been done for all the learning target parts (S36: NO), the CPU 31 returns the process to S33 so as to carry out the processes for outstanding learning target part(s).

Next, there will be described on transition of stored contents in the learnt-contents storing region 34A directed to the first embodiment in detail, by referring to FIG. 11.

First, there will be described on a case where the first round of a word learning process has been carried out. In this case, it is provided that "BOOK01" is dealt as to-be-printed letter string data. The "BOOK01" is divided into "BOOK" and "01" consisting of alphabets and Arabic numerals, respectively (S32). Accordingly, the CPU 31 sets only "BOOK" consisting of alphabets as learning target part (S33) based on the learning condition determination table (refer to FIG. 9). Since the "BOOK" has not been registered in the learnt-contents storing region 34A (S34: NO), the CPU 31 registers the "BOOK" in the learnt-contents storing region 34A (S35).

Next, there will be described on the subsequent second round of a word learning process. In this case, it is provided that "BOOK02(1)(2)(3)" is dealt as to-be-printed letter string data. It is to be noted that "(1)", "(2)" and "(3)" stand for Roman numerals "i", "ii" and "iii", respectively. The "BOOK02(1)(2)(3)" is divided into "BOOK", "02" and "(1)(2)(3)" consisting of alphabets, Arabic numerals and Roman numerals, respectively (S32). Accordingly, the CPU 31 sets only the "BOOK" as learning target part (S33) based on the learning condition determination table (refer to FIG. 9). Since the "BOOK" has already been registered in the learnt-contents storing region 34A (S34: YES) at the first round of the word learning process, the CPU 31 finalizes the process thereat without registering the "BOOK" in the learnt-contents storing region 34A. Accordingly, in this case, one item of the registered letter string data identical with the "BOOK" is not registered in the learnt-contents storing region 34A in duplicate.

Next, there will be described on the third round of a word learning process. In this case, it is provided that "BOOK03αβγ" is dealt as to-be-printed letter string data. The "BOOK03αβγ" is divided into "BOOK", "03" and "αβγ" consisting of alphabets, Arabic numerals and Greek alphabets, respectively (S32). Accordingly, the CPU 31 sets "BOOK" and "αβγ" as learning target parts (S33) based on the learning condition determination table (refer to FIG. 9). Since the "BOOK" has already been registered in the learnt-contents storing region 34A (S34: YES) at the first round of the word learning process, the CPU 31 does not register the "BOOK" in the learnt-contents storing region 34A. On the other hand, since the word "αβγ" has not been registered in the learnt-contents storing region 34A (S34: NO), the CPU 31 registers the "αβγ" in the learnt-contents storing region 34A (S35). Consequently, in this round of the word learning process, only the "αβγ" is newly registered in the learnt-contents storing region 34 without duplicate registration of the "BOOK".

As described, the tape printing apparatus 1 directed to the first embodiment is configured to extract a learning target part constituting a part of to-be-printed letter string data (S33) and to register the learning target part in the learnt-contents storing region 34A (S35) only in case the learning target part has not been registered in the learnt-contents storing region 34A (S34: NO).

Since the tape printing apparatus 1 is configured to register efficiently-used learning target parts as registered letter string data, stored contents in the learnt-contents storing region 34A are made to coincide with efficiently-used registered letter string data. Furthermore, since the tape printing apparatus 1 is configured to prevent duplicate registration of identical registered letter string data in the learnt-contents storing region 34A, capacity of the learnt-contents storing region 34A can be used efficiently.

(Second Embodiment)

Next, another embodiment (second embodiment) different from the first embodiment will be described in detail by referring to drawings. A basic structure of a tape printing apparatus 1 directed to the second embodiment is almost the same as that of the one directed to the first embodiment. Therefore, in the description of the second embodiment, identical numerical signs will be used to refer to constituent elements identical with ones directed to the first embodiment.

Further, only contents of a word learning control process program for the second embodiment differ from those for the foregoing embodiment. Therefore, the contents of the word learning control process program will be described in detail by referring to FIG. 12.

At S41, the CPU 31 determines whether or not a determination-target set of words is completely identical with one item of registered letter string data in the learnt-contents storing region 34A. The determination process at S41 is the same as the one at S31 for the first embodiment. In case the determination-target set of words and one item of the registered letter string data are completely identical with each other (S41: YES), the CPU 31 finalizes the word learning control process program. On the other hand, in case the determination-target set of words and any one item of the registered letter string data are not completely identical with each other (S41: NO), the CPU 31 shifts the process to S42.

At S42, the CPU 31 carries out a determination-target set of words dividing process. The determination-target set of words dividing process (S42) is the same as the determination-target set of words dividing process (S32) for the first embodiment. Upon completion of the determination-target set of words dividing process (S42), the CPU 31 shifts the process to S43.

Shifting to the S43, the CPU 31 extracts a registration-control-target part from a determination-target set of words. Specifically, the CPU 31 extracts a homogeneous-kind letter string consisting of a single kind of letters as registration-control-target part, from among the homogeneous-kind letter strings divided at the determination-target set of words dividing process (S42). A registration-control-target part refers to a target to be controlled and possibly be registered in the learnt-contents storing region 34A. Extracting the registration-control-target part, the CPU 31 shifts the process to S44.

Figures 8, 9:
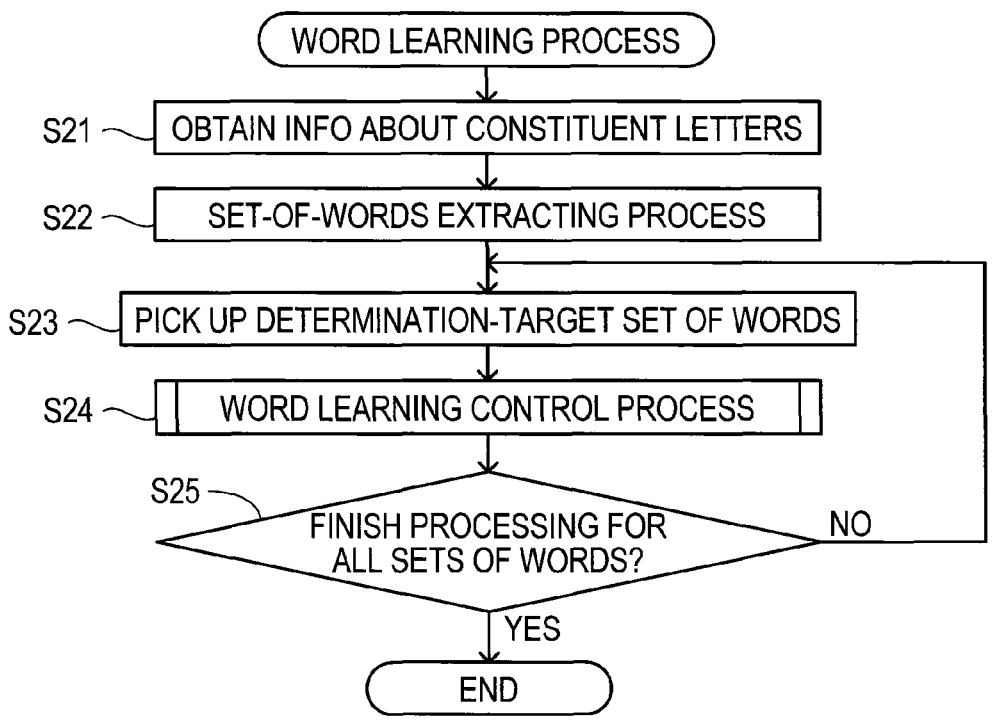
FIG. 8 is a flowchart of a word learning process program.
FIG. 9 is a diagram for illustrating a learning condition determination table.

At S44, the CPU 31 determines whether or not the kind of letters constituting the registration-control-target part is subordinate attribution based on information about constituent letters directed to the registration-control-target part and the learning condition determination table (refer to FIG. 9). In case the registration-control-target part is subordinate attribution (S44: YES), the CPU 31 shifts the process to S47. On the other hand, in case the registration-control-target part is main attribution (S44: NO), the CPU 31 shifts the process to S45.

At S45, the CPU 31 determines whether or not the registration-control-target part is identical with one item of the registered letter string data stored in the learnt-contents storing region 34A based on the information about constituent letters directed to the registration-control-target part and the stored contents in the learnt-contents storing region 34A. In case the registration-control-target part is identical with one item of the registered letter string data each other (S45: YES), the CPU 31 shifts the process to S49. On the other hand, in case the registration-control-target part is not identical with any one item of the registered letter string data with each other (S45: NO), the CPU 31 shifts the process to S46.

Shifting to S46, the CPU 31 carries out a registration-control-target main part registering process. At the registration-control-target main part registering process (S46), the CPU 31 registers a registration-control-target part that has main attribution in the learnt-contents storing region 34A as registered letter string data that has main attribution. That is, in case a homogeneous-kind letter string constituting a registration-control-target part has not been registered in the learnt-contents storing region 34A and has had main attribution, the tape printing apparatus 1 is configured to learn the homogeneous-kind letter string constituting the registration-control-target part as registered letter string data that has main attribution. Upon completion of the registration-control-target main part registering process, the CPU 31 shifts the process to S49.

At S47, the CPU 31 identifies registered letter string data corresponding to a combinable registered main part from among the registered letter string data stored in the learnt-contents storing region 34A. Here, "registered letter string data corresponding to a combinable registered main part" refers to registered letter string data that has main attribution combinable with registration-control-target part having subordinate attribution. After identifying the registered letter string data corresponding to the combinable registered main part, the CPU 31 shifts the process to S48.

At S48, the CPU 31 carries out a combination-learning registering process. At the combination-learning registering process (S48), the CPU 31 associates the registration-control-target part having subordinate attribution with the registered letter string data corresponding to the combinable registered main part identified at S47 and registers the registration-control-target part in the learnt-contents storing region 34A. Upon completion of the connection-learning-result registering process, the CPU 31 shifts the process to S49.

Shifting to S49, the CPU 31 determines whether or not a series of processes of S43 through S48 has been carried out for all the registration-control-target parts constituting the to-be-printed letter string data. In case the series of the processes has been done for all the registration-control-target parts (S49: YES), the CPU 31 finalizes the word learning control process program and shifts the process to S25. On the other hand, the series of the processes has not been done for all the registration-control-target parts (S49: NO), the CPU 31 returns the process to S43 so as to carry out the processes for outstanding registration-control-target part(s).

Figures 12, 13:
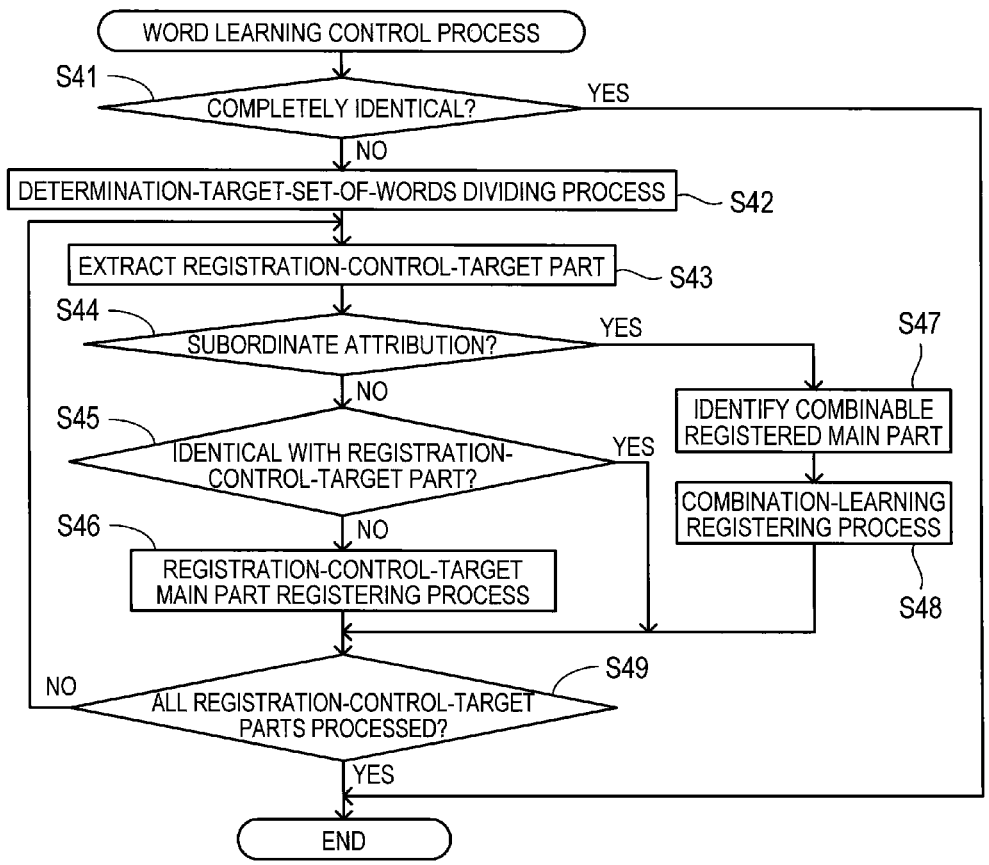
FIG. 12 is a flowchart of a word learning control process program directed to a second embodiment.
FIG. 13 is a diagram for explaining stored contents of a learnt-contents storing region directed to the second embodiment.

Next, there will be described on transition of stored contents in the learnt-contents storing region 34A directed to the second embodiment in detail, by referring to FIG. 13.

First, there will be described on a case where the first round of a word learning process has been carried out. In this case, it is provided that "BOOK01" is dealt as to-be-printed letter string data. The "BOOK01" is divided into "BOOK" and "01" consisting of alphabets and Arabic numerals, respectively (S42). Accordingly, based on the learning condition determination table (refer to FIG. 9), the CPU 31 identifies the "BOOK" consisting of alphabets as main part and "01" consisting of Arabic numerals as subordinate part (S44). Since the "BOOK" and the "01" have not been registered in the learnt-contents storing region 34A (S45: NO), the CPU 31 registers both the "BOOK" and the "01" in the learnt-contents storing region 34A, wherein the "BOOK" is registered as main part (S46) and the "01" is registered as subordinate part that is associated as combinable with registered letter string data corresponding to the "BOOK" (S48).

Next, there will be described on the subsequent second round of a word learning process. In this case, it is provided that "BOOK02" is dealt as to-be-printed letter string data. The "BOOK02" is divided into "BOOK" and "02" consisting of alphabets and Arabic numerals, respectively (S42). Accordingly, based on the learning condition determination table (refer to FIG. 9), the CPU 31 identifies the "BOOK" and the "02" as main part and subordinate part, respectively (S44). Since the "BOOK" has been registered in the learnt-contents storing region 34A at the first round of the word learning process (S45: YES), the CPU 31 does not register the "BOOK" in the learnt-contents storing region 34A. On the other hand, the "02" is registered as registered letter string data with respect to the subordinate part that shall be combined with the registered letter string data corresponding to the "BOOK" (S48). Accordingly, in this case, the registered letter string data identical with the "BOOK" is not registered in the learnt-contents storing region 34A in duplicate. Further, registered letter string data directed to "01" and "02" are registered as subordinate part combinable with the registered letter string data corresponding to the "BOOK".

Next, there will be described on the third round of a word learning process. In this case, it is provided that "BOOK03" is dealt as to-be-printed letter string data. The "BOOK03" is divided into "BOOK" and "03" consisting of alphabets and Arabic numerals, respectively (S42). Accordingly, based on the learning condition determination table (refer to FIG. 9), the CPU 31 identifies the "BOOK" and the "03" as main part and subordinate part, respectively (S44). Since the "BOOK" has been registered in the learnt-contents storing region 34A at the first round of the word learning process (S45: YES), the CPU 31 does not register the "BOOK" in the learnt-contents storing region 34A. On the other hand, the "03" is registered as registered letter string data corresponding to the subordinate part that shall be combined with the registered letter string data corresponding to the "BOOK" (S48). Accordingly, in this case, the registered letter string data corresponding to the "BOOK" is not registered in the learnt-contents storing region 34A in duplicate. Further, registered letter string data corresponding to "01", "02" and "03" are registered as subordinate parts combinable with the registered letter string data corresponding to the "BOOK".

As described, the tape printing apparatus 1 directed to the second embodiment is configured to identify a main part and a subordinate part both constituting a determination-target set of words (S44). In any cases as long as a registration-control-target part is identical with one item of the registered letter string data, the tape printing apparatus 1 does not register those identified parts in the learnt-contents storing section 34A. In case the registration-control-target part is the subordinate part and no registered letter string data identical with the registration-control-target part is stored, the CPU 31 newly registers the subordinate part as registered letter string data associated with the registered letter string data corresponding to the combinable main part (S48).

Since the tape printing apparatus 1 is configured to register efficiently-used registration-control-target parts as registered letter string data, stored contents in the learnt-contents storing region 34A are made to coincide with efficiently-used registered letter string data. Further, since the tape printing apparatus 1 is configured to prevent duplicate registration of registered letter string data corresponding to an identical main part in the learnt-contents storing region 34A, capacity of the learnt-contents storing region 34A can be used efficiently. Still further, the tape printing apparatus 1 is configured to register registered letter string data corresponding to subordinate parts sequentially. Thereby, the learnt contents are diversified, which contributes to efficient use of the learnt contents.

(Third Embodiment)

Next, another embodiment (third embodiment) different from the foregoing embodiments will be described in detail by referring to drawings. A basic structure of a tape printing apparatus 1 directed to the third embodiment is almost the same as that of the one directed to the foregoing embodiments. Therefore, in the description of the third embodiment, identical numerical signs will be used to refer to constituent elements identical with ones directed to the foregoing embodiments.

Further, only contents of a word learning control process program for the third embodiment differ from those for the foregoing embodiments. Therefore, the contents of the word learning control process program will be described in detail by referring to FIG. 14.

The process contents of S51 through S56 are the same as those of S41 through S46 for the second embodiment. Therefore, detailed description on the processes S51 through S56 will be omitted.

At S57, the CPU 31 identifies registered letter string data corresponding to a combinable registered main part from among the registered letter string data stored in the learnt-contents storing region 34A. The process contents of S57 are the same as those of S47. After identifying the registered letter string data corresponding to the combinable registered main part, the CPU 31 shifts the process to S58.

At S58, the CPU 31 determines whether or not a subordinate part combinable with registered letter string data corresponding to a combinable registered main part has been registered based on stored contents of the learnt-contents storing region 34A. That is, the CPU 31 judges whether or not combination learning has been carried out with respect to association of the subordinate part and a combinable registered main part has been carried out. In case combination learning has already been carried out (S58:YES), the CPU 31 shifts the process to S60. On the other hand, in case combination learning has not been carried out yet (S58: NO), the CPU 31 shifts the process to S59.

At S59, the CPU 31 carries out a combination-learning registering process. The combination-learning registering process at S59 is the same as the combination-learning registering process at S48. Upon completion of the combination-learning registering process (S59), the CPU 31 shifts the process to S60.

Shifting to S60, the CPU 31 determines whether or not a series of processes of S53 through S59 has been carried out for all the registration-control-target parts constituting the to-be-printed letter string data. In case the series of the processes has been done for all the registration-control-target parts (S60: YES), the CPU 31 finalizes the word learning control process program and shifts the process to S25. On the other hand, in case the series of the processes has not been done for all the registration-control-target parts (S60: NO), the CPU returns the process to S53 so as to carry out the processes for outstanding registration-control-target part(s).

Next, there will be described on transition of stored contents in the learnt-contents storing regions 34A directed to the third embodiment in detail, by referring to FIG. 15.

First, there will be described on a case where the first round of a word learning process has been carried out. In this case, it is provided that "BOOK01" is dealt as to-be-printed letter string data. The first round of a word learning process in the third embodiment is basically the same as the first round thereof in the second embodiment. Accordingly, the CPU 31 registers both the "BOOK" and the "01" in the learnt-contents storing region 34A, wherein the "BOOK" is registered as main part (S56) and the "01" is registered as subordinate part that is associated as combinable with registered letter string data corresponding to the "BOOK" (S59).

Next, there will be described on the subsequent second round of a word learning process. In this case, it is provided that "BOOK02" is dealt as to-be-printed letter string data. The "BOOK02" is divided into "BOOK" and "02" consisting of alphabets and Arabic numerals, respectively (S52). Accordingly, based on the learning condition determination table (refer to FIG. 9), the CPU 31 identifies the "BOOK" and the "02" as main part and subordinate part, respectively (S54). Since the "BOOK" has been registered in the learnt-contents storing region 34A at the first round of the word learning process (S55:YES), the CPU 31 does not register the "BOOK" in the learnt-contents storing region 34A. On the other hand, since the registered letter string data corresponding to "01" has been registered as registered letter string data corresponding to the subordinate part to be combined with registered letter string data corresponding to the "BOOK" in the first round (S58: YES), the "02" is not registered in the learnt-contents storing region 34A in this second round. Accordingly, in this case, the registered letter string data corresponding to the "BOOK" is not registered in the learnt-contents storing region 34A in duplicate. Only the registered letter string data corresponding to the "01" remains registered as combinable with the registered letter string data corresponding to the "BOOK".

As described, the tape printing apparatus 1 directed to the third embodiment is configured to identify a main part and a subordinate part both constituting to-be-printed letter string data (S54). In any cases as long as one of registration-control-target parts is identical with one item of registered letter string data, the identical registration-control-target part is not registered in the learnt-content storing region 34A. In case where a registration-control-target part is a subordinate part which is not registered as registered letter string data and another subordinate part combinable with the same registration-control-target main part has already been registered, the CPU 31 keeps current storing condition of the learnt-content storing region 34A.

Since the tape printing apparatus 1 is configured to register efficiently-used registration-control-target parts as registered letter string data, stored contents in the learnt-contents storing region 34A are made to coincide with efficiently-used registered letter string data. Further, since the tape printing apparatus 1 is configured to prevent duplicate registration of registered letter string data corresponding to an identical main part in the learnt-contents storing region 34A, capacity of the learnt-contents storing region 34A can be used efficiently. Still further, the tape printing apparatus 1 is configured to keep current storing condition so as to prevent from storing new data in case where a subordinate part combinable with a certain registration-control-target main part has already been registered. Thereby, capacity of the learnt-contents storing region 34A can be used efficiently.

(Fourth Embodiment)

Next, another embodiment (fourth embodiment) different from the foregoing embodiments will be described in detail by referring to drawings. A basic structure of a tape printing apparatus 1 directed to the fourth embodiment is almost the same as that of the one directed to the foregoing embodiments. Therefore, in the description of the fourth embodiment, identical numerical signs will be used to refer to constituent elements identical with ones directed to the foregoing embodiments. Further, only contents of a word learning control process program for the fourth embodiment differ from those for the foregoing embodiments. Therefore, the contents of the word learning control process program will be described in detail by referring to FIG. 16.

The process contents of S61 through S66 are the same as those of S51 through S56 for the third embodiment. Therefore, detailed description on the processes S61 through S66 will be omitted.

At S67, the CPU 31 identifies registered letter string data corresponding to a combinable registered main part from among the registered letter string data stored in the learnt-contents storing region 34A. The process contents of S67 are the same as those of S57. After identifying the registered letter string data corresponding to the combinable registered main part, the CPU 31 shifts the process to S68.

At S68, the CPU 31 determines whether or not a subordinate part combinable with registered letter string data corresponding to a combinable registered main part has been registered based on stored contents of the learnt-contents storing region 34A. That is, the CPU 31 judges whether or not combination learning has been carried out with respect to association of the subordinate part and a combinable registered main part. In case combination learning has already been carried out (S68: YES), the CPU 31 shifts the process to S69. On the other hand, in case combination learning has not been carried out yet (S68: NO), the CPU 31 shifts the process to S70.

Shifting to S69, the CPU 31 carries out a combination-learning renewing process. At the combination-learning renewing process (S69), the CPU 31 renews registered letter string data currently associated with registered letter string data corresponding to a combinable registered main part, with letter string data corresponding to a registration-control-target part of this time. Upon completion of the combination-learning renewing process (S69), the CPU 31 shifts the process to S71.

At S70, the CPU 31 carries out a combination-learning registering process. The combination-learning registering process at S70 is the same as the combination-learning registering process at S59. Upon completion of the combination-learning registering process (S70), the CPU 31 shifts the process to S71.

Shifting to S71, the CPU 31 determines whether or not a series of processes of S63 through S70 has been carried out for all the registration-control-target parts constituting the to-be-printed letter string data. In case the series of the processes has been done for all the registration-control-target parts (S71: YES), the CPU 31 finalizes the word learning control process program and shifts the process to S25. On the other hand, in case the series of the processes has not been done for all the registration-control-target parts (S71: NO), the CPU 31 returns the process to S63 so as to carry out the processes for outstanding registration-control-target part(s).

Next, there will be described on transition of stored contents in the learnt-contents storing regions 34A directed to the fourth embodiment in detail, by referring to FIG. 17.

First, there will be described on a case where the first round of a word learning process has been carried out. In this case, it is provided that "BOOK01" is dealt as to-be-printed letter string data. The first round of a word learning process in the fourth embodiment is basically the same as the first round thereof in the third embodiment. Accordingly, the CPU 31 registers both the "BOOK" and the "01" in the learnt-contents storing region 34A, wherein the "BOOK" is registered as main part (S66) and the "01" is registered as subordinate part that is associated as combinable with registered letter string data corresponding to the "BOOK" (S70).

Next, there will be described on the subsequent second round of a word learning process. In this case, it is provided that "BOOK02" is dealt as to-be-printed letter string data. The "BOOK02" is divided into "BOOK" and "02" consisting of alphabets and Arabic numerals, respectively (S62). Accordingly, based on the learning condition determination table (refer to FIG. 9), the CPU 31 identifies the "BOOK" and the "02" as main part and subordinate part, respectively (S64). Since the "BOOK" has been registered in the learnt-contents storing region 34A at the first round of the word learning process (S65: YES), the CPU 31 does not register the "BOOK" in the learnt-contents storing region 34A. On the other hand, since the registered letter string data corresponding to the "01" has been registered as registered letter string data corresponding to the subordinate part to be combined with registered letter string data corresponding to the "BOOK" in the first round (S68: YES), registered letter string data corresponding to the subordinate part combinable with registered letter string data corresponding to the "BOOK" is renewed from the "01" to the "02". Accordingly, in this case, the registered letter string data identical with the "BOOK" is not registered in the learnt-contents storing region 34A in duplicate. The registered letter string data corresponding to a last-used subordinate part is registered as being combined with registered letter string data corresponding to the "BOOK".

As described, the tape printing apparatus 1 directed to the fourth embodiment is configured to identify a main part and a subordinate part both constituting to-be-printed letter string data (S64). In any cases as long as one of registration-control-target parts is identical with one item of registered letter string data, the identical registration-control-target part is not registered in the learnt-content storing region 34A. In case where a registration-control-target part is a subordinate part which is not registered as registered letter string data and another subordinate part combinable with the same registration-control-target main part has already been registered, the CPU 31 renews with registered letter string data corresponding to the last-used subordinate part.

Since the tape printing apparatus 1 is configured to register efficiently-used registration-control-target parts as registered letter string data, stored contents in the learnt-contents storing region 34A are made to coincide with efficiently-used registered letter string data. Further, since the tape printing apparatus 1 is configured to prevent duplicate registration of registered letter string data corresponding to an identical main part in the learnt-contents storing region 34A, capacity of the learnt-contents storing region 34A can be used efficiently. Still further, in case where a subordinate part combinable with a certain registration-control-target main part has already been registered, the tape printing apparatus 1 is configured to renew registered letter string data corresponding to a last-printed subordinate part so as to prevent from registering plural items of registered letter string data that include subordinate parts combinable with the same registration-control-target main part. Thereby, capacity of the learnt-contents storing region 34A can be used efficiently.

(Fifth Embodiment)

Next, another embodiment (fifth embodiment) different from the foregoing embodiments will be described in detail by referring to drawings. A basic structure of a tape printing apparatus 1 directed to the fifth embodiment is almost the same as that of the one directed to the foregoing embodiments. Therefore, in the description of the fifth embodiment, identical numerical signs will be used to refer to constituent elements identical with ones directed to the foregoing embodiments.

Further, only contents of a word learning control process program for the fifth embodiment differ from those for the foregoing embodiments. Therefore, the contents of the word learning control process program will be described in detail by referring to FIG. 18.

At S81, the CPU 31 determines whether or not the determination-target set of words is completely identical with one item of registered letter string data that have been registered in the learnt-contents storing region 34A. The determination process at S81 is the same as processing contents at S61 directed to the fourth embodiment. In case the determination-target set of words and one item of the registered letter string data are completely identical with each other (S81: YES), the CPU 31 finalizes the word learning control process. On the other hand, in case the determination-target set of words and any one item of the registered letter string data are not completely identical with each other (S81: NO), the CPU 31 shifts the process to S82.

At S82, the CPU 31 carries out a determination-target set of words dividing process. The determination-target set of words dividing process at S82 is the same as the processing contents of the determination-target set of words dividing process (S62) directed to the fourth embodiment. Specifically, the CPU 31 divides a determination-target set of words into a main part and a subordinate part (refer to FIG. 9). Upon completion of the determination-target set of word dividing process (S82), the CPU 31 shifts the process to S83.

Shifting to S83, the CPU 31 extracts a main part from the determination-target set of words based on the learning condition determination table and information about constituent letters directed to the determination-target set of words. The main part refers to a word consisting of a kind of letters that has main attribution from among the set of words divided at the determination-target set of words dividing process (S82). Upon extracting the main part from the determination-target set of words, the CPU 31 shifts the process to S84.

At S84, the CPU 31 determines whether or not the letter string corresponding to the main part is identical with one item of registered letter string data. In case the main part is identical with one item of the registered letter string data (S84: YES), the CPU 31 finalizes the word learning control process program without registering determination-target set of words and shifts the process to S25. That is, in case where only a word corresponding to a subordinate part in a determination-target set of words differs from one item of registered letter string data (S84: YES), the CPU 31 does not register the determination-target set of words. On the other hand, in case a word corresponding to a main part in a determination-target set of words differs from one item of registered letter string data (S84: NO), the CPU 31 shifts the process to S85. At S85, the CPU 31 carries out a determination-target set of words registering process. At the determination-target set of words registering process (S85), the CPU 31 registers the entirety of the determination-target set of words subject to the word learning control process as registered letter string data in the learnt-contents storing region 34A. Upon completion of the determination-target set of words registering process, the CPU 31 finalizes the word learning control process program and shifts the process to S25.

Figures 18, 19:
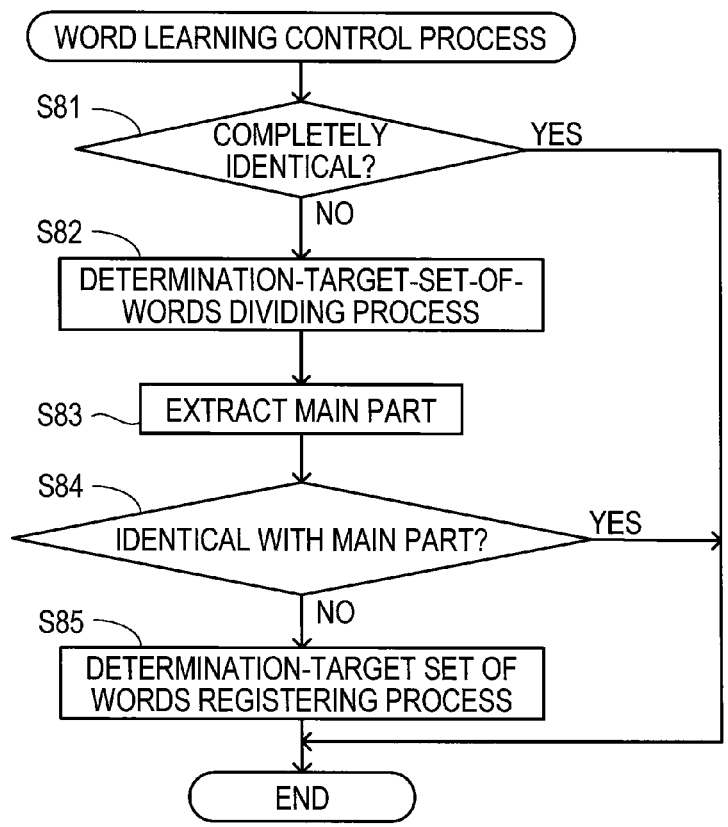
FIG. 18 is a flowchart of a word learning control process program directed to a fifth embodiment.
FIG. 19 is a diagram for explaining stored contents of a learnt-contents storing region directed to the fifth embodiment.

Next, there will be described on transition of stored contents in the learnt-contents storing region 34A directed to the fifth embodiment in detail, by referring to FIG. 19.

First, there will be described on a case where the first round of a word learning process has been carried out. In this case, it is provided that "BOOK01" is dealt as to-be-printed letter string data. The "BOOK01" is divided into "BOOK" and "01" consisting of alphabets and Arabic numerals, respectively (S82). Accordingly, the CPU 31 identifies the "BOOK" consisting of alphabets as main part and the "01" consisting of Arabic numerals as subordinate part based on the learning condition determination table (FIG. 9). Since the "BOOK" and the "01" have not been registered in the learnt-contents storing region 34A (S84: NO), the CPU 31 registers the "BOOK01" in the learnt-contents storing region 34A (S85).

Next, there will be described on the subsequent second round of a word learning process. In this case, it is provided that "BOOK02" is dealt as to-be-printed letter string data. The "BOOK02" is divided into "BOOK" and "02" consisting of alphabets and Arabic numerals, respectively (S82). Accordingly, based on the learning condition determination table (refer to FIG. 9), the CPU 31 identifies the "BOOK" and the "02" as main part and subordinate part, respectively (S82). The only difference between "BOOK02" and the "BOOK01" registered in the learnt-contents storing region 34A through the first round of the word learning process lies in their subordinate parts (namely, "01" and "02"), (S84: YES). Accordingly, the CPU 31 does not register the "BOOK02" in the learnt-contents storing region 34A.

As described, in case where a to-be-printed letter string is identical with registered letter string data by its main part but different from the data by its subordinate part that is not efficiently used (S84: YES), the tape printing apparatus 1 directed to the fifth embodiment is configured to prevent from registering the last to-be-printed letter string as registered letter string data.

Since the tape printing apparatus 1 is configured to register efficiently-used registration-control-target parts as registered letter string data, stored contents in the learnt-contents storing region 34A are made to coincide with efficiently-used registered letter string data. Further, the tape printing apparatus 1 is configured to prevent duplicate registration in case where the to-be-printed letter string consists of a main part identical with one item of registered letter string data and a subordinate part not identical with any one item of registered letter string data. Therefore, capacity of the learnt-contents storing region 34A can be used efficiently.

(Sixth Embodiment)

Next, another embodiment (sixth embodiment) different from the foregoing embodiments will be described in detail by referring to drawings. A basic structure of a tape printing apparatus 1 directed to the sixth embodiment is almost the same as that of the one directed to the foregoing embodiments. Therefore, in the description of the sixth embodiment, identical numerical signs will be used to refer to constituent elements identical with ones directed to the foregoing embodiments.

Further, only contents of a word learning control process program for the sixth embodiment differ from those for the foregoing embodiments. Therefore, the contents of the word learning control process program will be described in detail by referring to FIG. 20.

The process contents of S91 through S93 are the same as those of S81 through S83 for the fifth embodiment. Therefore, detailed description on the processes S91 through S93 will be omitted.

At S94, the CPU 31 determines whether or not the letter string corresponding to the main part is identical with one item of registered letter string data. In case the main part is identical with one item of the registered letter string data (S94: YES), the CPU 31 shifts the process to S96. On the other hand, in case the main part is not identical with any one item of the registered letter string data (S94: NO), the CPU 31 shifts the process to S95.

At S95, the CPU 31 carries out a determination-target set of words registering process. The process contents of the determination-target set of words registering process (S95) is the same as those of the determination-target set of words registering process (S85) directed to the fifth embodiment. Upon completion of the determination-target set of words registering process, the CPU 31 finalizes the word learning control process program and shifts the process to S25.

Shifting to S96, the CPU 31 carries out a determination-target set of words renewing process. At the determination-target set of words renewing process (S96), the CPU 31 identifies one item of registered letter string data that includes a main part identical with the main part in the determination-target set of words. Thereafter, the CPU 31 renews the thus identified registered letter string data with the data corresponding to the determination-target set of words. As a result, in the learnt-contents storing region 34A, the registered letter string data corresponding to the determination-target set of words is stored as only one item of the registered letter string data that includes the main part. That is, two or more items of registered letter string data that include the same main part are not registered there. Upon completion of the determination-target set of words renewing process, the CPU 31 finalizes the word learning control process program and shifts the process to S25.

Figures 20, 21:
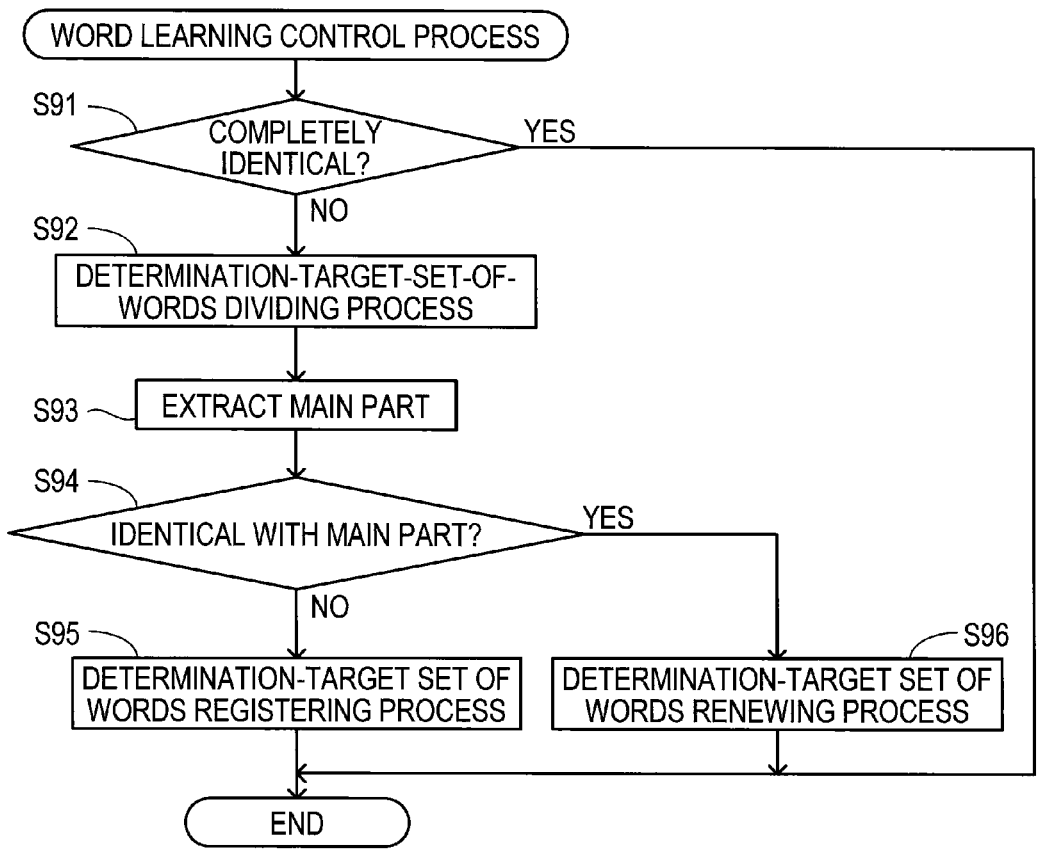
FIG. 20 is a flowchart of a word learning control process program directed to a sixth embodiment.
FIG. 21 is a diagram for explaining stored contents of a learnt-contents storing region directed to the sixth embodiment.

Next, there will be described on transition of stored contents in the learnt-contents storing region 34A directed to the sixth embodiment in detail, by referring to FIG. 21.

First, there will be described on a case where the first round of a word learning process has been carried out. In this case, it is provided that "BOOK01" is dealt as to-be-printed letter string data. The first round of the word learning process in the sixth embodiment is basically the same as the first round of the word learning process in the fifth embodiment. Accordingly, the CPU 31 registers the "BOOK01" in the learnt-contents storing region 34A (S95).

Next, there will be described on the subsequent second round of a word learning process. In this case, it is provided that "BOOK02" is dealt as to-be-printed letter string data. The "BOOK02" is divided into "BOOK" and "02" consisting of alphabets and Arabic numerals, respectively (S92). Accordingly, based on the learning condition determination table (refer to FIG. 9), the CPU 31 identifies the "BOOK" and the "02" as main part and subordinate part, respectively (S92). The only difference between "BOOK02" and the "BOOK01" registered in the learnt-contents storing region 34A through the first round of the word learning process lies in their subordinate parts (namely, "01" and "02"), (S94: YES). Accordingly, the CPU 31 renews the current registered letter string data corresponding to the "BOOK01" with new registered letter string data corresponding to the "BOOK02" for registration (S96).

As described, in case where a to-be-printed letter string is identical with one item of registered letter string data in terms of its main part but different from the data in terms of its subordinate part that is not efficiently used (S94: YES), the tape printing apparatus 1 directed to the sixth embodiment is configured to renew the said one item with registered letter string data corresponding to the to-be-printed letter string.

Since the tape printing apparatus 1 is configured to register efficiently-used registration-control-target parts as registered letter string data, stored contents in the learnt-contents storing region 34A are made to coincide with efficiently-used registered letter string data. Further, in case where the to-be-printed letter string consists of a main part identical with one item of registered letter string data and a subordinate part not identical with any one item of registered letter string data, the tape printing apparatus 1 is configured to renew the registered letter string data corresponding to the last-used to-be-printed letter string. Therefore, the latest to-be-printed letter string is registered as registered letter string data in the learnt-contents storing region 34A so that two or more of registered letter string data that have an identical main part do not exist therein. Thereby, the tape printing apparatus 1 can use capacity of the learnt-contents storing region 34A efficiently.

(Seventh Embodiment)

Next, another embodiment (seventh embodiment) different from the foregoing embodiments will be described in detail by referring to drawings. A basic structure of a tape printing apparatus 1 directed to the seventh embodiment is almost the same as that of the one directed to the foregoing embodiments. Therefore, in the description of the seventh embodiment, identical numerical signs will be used to refer to constituent elements identical with ones directed to the foregoing embodiments.

Further, only the contents of a word learning control process program for the seventh embodiment differ from those for the foregoing embodiments. Therefore, the contents of the word learning control process program will be described in detail by referring to FIG. 22.

At S101, the CPU 31 determines whether or not the determination-target set of words is completely identical with one item of registered letter string data that have been registered in the learnt-contents storing region 34A. The determination process at S101 is the same as processing contents at S91 directed to the sixth embodiment. In case the determination-target set of words and one item of the registered letter string data are completely identical with each other (S101: YES), the CPU 31 finalizes the word learning control process. On the other hand, in case the determination-target set of words and any one item of the registered letter string data are not completely identical with each other (S101: NO), the CPU 31 shifts the process to S102.

At S102, the CPU 31 obtains information about constituent letters with respect to the determination-target set of words. That is, the CPU 31 obtains information about kinds of respective letters constituting the determination-target set of words. Obtaining the information about the constituent letters, the CPU 31 shifts the process to S103.

After shifting to S103, the CPU 31 determines whether or not the determination-target set of words includes non-determination-target letter(s) based on the obtained information about the constituent letters and the learning condition determination table (refer to FIG. 9). The non-determination-target letter(s) refers to a kind of letter(s) defined as "learning setting: invalid" in the learning condition determination table. In case the determination-target set of the words includes non-determination-target letter(s) (S103: YES), the CPU 31 finalizes the word learning control process program and shifts the process to S25. On the other hand, in case the determination-target set of words does not include non-determination-target letter(s) (S103: NO), the CPU 31 shifts the process to S104.

At S104, the CPU 31 carries out a determination-target set of words registering process. At the determination-target set of words registering process (S104), the CPU 31 registers the entirety of the determination-target set of words subject to the word learning control process as registered letter string data in the learnt-contents storing region 34A. Upon completion of the determination-target set of words registering process, the CPU 31 finalizes the word learning control process program and shifts the process to S25.

Figures 22, 23:
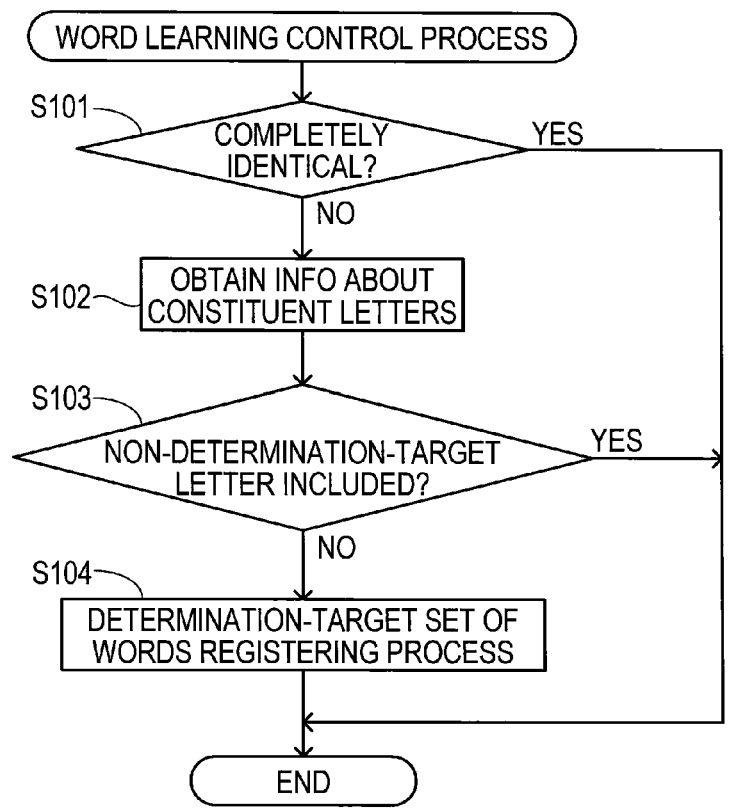
FIG. 22 is a flowchart of a word learning control process program directed to a seventh embodiment.
FIG. 23 is a diagram for explaining stored contents of a learnt-contents storing region directed to the seventh embodiment.

Next, there will be described on transition of stored contents in the learnt-contents storing regions 34A directed to the seventh embodiment in detail, by referring to FIG. 23.

First, there will be described on a case where "BOOK" is dealt as to-be printed letter string data. In this case, the "BOOK", the determination-target set of word(s), consists of alphabets only. That is, the "BOOK" does not include any non-determination-target letters (refer to FIG. 9) (S103: NO), the CPU 31 registers the determination-target set of word(s), namely, the "BOOK", as registered letter string in the learnt-contents stored region 34A (S104).

Next, there will be described on a case where "BOOK01" is dealt as to-be printed letter string data. In this case, the "BOOK01", the determination-target set of words, consists of "BOOK", the alphabets, and "01", the Arabic numerals. As shown in FIG. 9, the learning condition determination table defines Arabic numerals as non-determination-target letters. Since the "BOOK01" includes non-determination-target letters, namely the "01" (S103: YES), the CPU 31 finalizes the process without registering the to-be-printed letter string data of this wound.

As described, in case where a determination-target set of word(s) includes non-determination-target letter(s), the tape printing apparatus 1 directed to the seventh embodiment is configured to exclude the determination-target set of word(s) from registration target. In only case where a determination-target set of word(s) does not include any non-determination-target letter(s), the tape printing apparatus 1 is configured to register the determination-target set of word(s) as registered letter string data.

Since the tape printing apparatus 1 is configured to register efficiently-used registration-control-target parts as registered letter string data, stored contents in the learnt-contents storing region 34A are made to coincide with efficiently-used registered letter string data. Further, the tape printing apparatus 1 is configured to prevent from registering a determination-target set of word(s) that consists of a word identical with one item of registered letter string data and non-determination-target letter(s). Therefore, capacity of the learnt-contents storing region 34A can be used efficiently.

While presently exemplary embodiments of the present disclosure have been shown and described, it is to be understood that this disclosure is for the purpose of illustration and that various changes and modifications may be made without departing from the scope of the disclosure as set forth in the appended claims.

What is claimed is:

1. A printer comprising:
   a letter string input unit that inputs letter string data consisting of plural letters as to-be-printed target;
   a print control unit that is operated in response to letter string data being inputted by the letter string input unit as to-be-printed target;
   a print unit that prints the inputted letter string on a printing medium in response to the print control unit;
   a storage unit that stores registered letter string data including a specific letter string;
   a detector unit that detects registration-target letter string data to be stored in the storage unit from the inputted letter string data in response to the print control unit; and
   a registration unit that registers the registration-target letter string data detected by the detector unit into the storage unit as the registered letter string data in accordance with a predetermined condition,
   wherein the printer further comprises:
   a divider unit that divides the registration-target letter string data into specific letter string data corresponding to the specific letter string and additional letter string data is added to the specific letter string data;
   a judgment unit that judges if the registration-target letter string data and a combination of the specific letter string data and the additional letter string data are identical, based on a registered letter string stored in the storage unit; and
   a registration control unit that controls the registration unit so as to, in response to a judgment result obtained by a judgment unit, change registration rules for storing registration-target letter string data in the storage unit.

2. The printer according to claim 1,
   wherein, in case the judgment unit judges that the specific letter string data is identical to the registered letter string data and the additional letter string data is not identical to the registered letter string data,
   the registration control unit controls the registration unit so as to exclude the registration-target letter string data from registration target to be stored in the storage unit.

3. The printer according to claim 1,
   wherein the storage unit associates the specific letter string data with additional letter string data that has been added to the specific letter string data and stores association thereof as the registered letter string data, and
   wherein, in case the judgment unit judges that the specific letter string data is identical to the registered letter string data and the additional letter string data is not identical to the registered letter string data,
   the registration control unit controls the registration unit so as to change registration rules with respect to registration-target letter string data consisting of specific letter string data and additional letter string data.

4. The printer according to claim 3,
   wherein, in case the judgment unit judges that the specific letter string data is identical to the registered letter string data and the additional letter string data is not identical to the registered letter string data,
   the registration control unit controls the registration unit so as to associate the additional letter string data constituting the registration-target letter string data with registered letter string data that is identical to the specific letter string data and to additionally register the additional letter string data in the storage unit as new registered letter string data.

5. The printer according to claim 3,
   wherein, in case the judgment unit judges that the specific letter string data is identical to the registered letter string data and the additional letter string data is not identical to the registered letter string data,
   on condition that other registered letter string data has been associated with registered letter string data that is identical to specific letter string data constituting the registration-target letter string data, the registration control unit controls the registration unit so as to exclude additional letter string data constituting the registration-target letter string data from registration target to be stored in the storage unit.

6. The printer according to claim 3,
   wherein, in case the judgment unit judges that the specific letter string data is identical to the registered letter string data and the additional letter string data is not identical to the registered letter string data,
   on condition that other registered letter string data has been associated with registered letter string data that is identical to specific letter string data constituting the registration-target letter string data, the registration control unit controls the registration unit so as to replace the other registered letter string data that has been associated with the registered letter string data according with the specific letter string data with the additional letter string data for renewal registration.

7. The printer according to claim 1,
wherein, in case the judgment unit judges that the specific letter string data is identical to the registered letter string data and the additional letter string data is not identical to the registered letter string data,
the registration control unit controls the registration unit so as to exclude from registration target to be stored in the storage unit registration-target letter string data consisting of the specific letter string data and additional letter string data.

8. The printer according to claim 3,
wherein, in case the judgment unit judges that the specific letter string data is identical to the registered letter string data and the additional letter string data is not identical to the registered letter string data,
the registration control unit controls the registration unit so as to replace registered letter string data corresponding to a combination of the specific letter string data and additional letter string data with registration-target letter string data consisting of the specific letter string data and additional letter string data for renewal registration.

9. The printer according to claim 1,
further comprising a registration prohibitory unit that determines a prohibitory letter string consisting of a particular letter string,
wherein, in case the judgment unit judges that the specific letter string data is identical to the registered letter string data and the additional letter string data is not identical to the registered letter string data,
on condition that the additional letter string data corresponds to the prohibitory letter string, the registration control unit controls the registration unit so as to exclude from registration target to be stored in the storage unit registration-target letter string data consisting of the specific letter string data and additional letter string data.

* * * * *